No. 858,126. PATENTED JUNE 25, 1907.
J. G. WENDLING.
LIFTING DEVICE FOR CLOTHES DRYING REELS.
APPLICATION FILED DEC. 10, 1904.
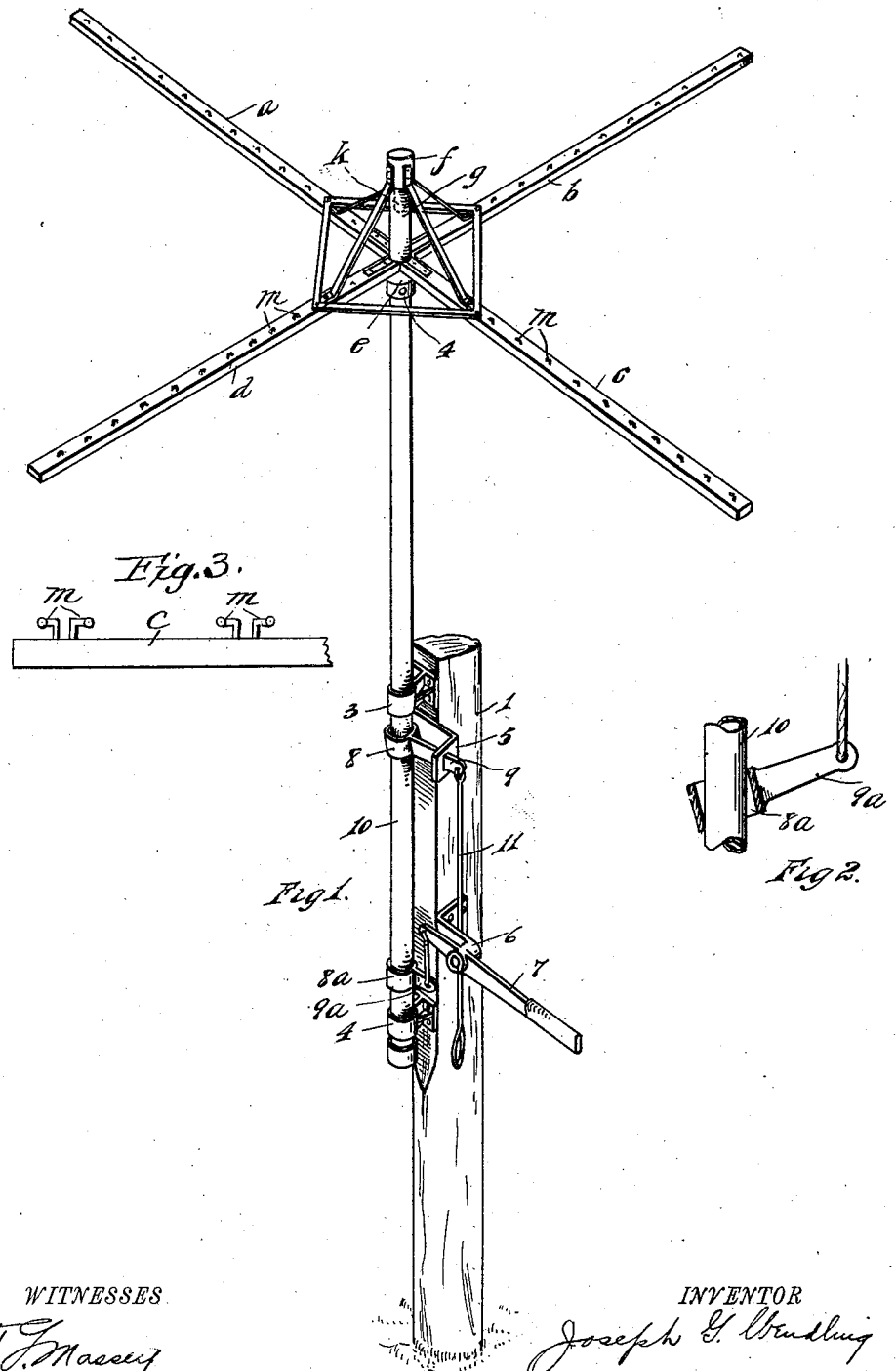
WITNESSES
INVENTOR
Joseph G. Wendling
By Parker & Burton Attorneys.

UNITED STATES PATENT OFFICE.

JOSEPH G. WENDLING, OF CHEBOYGAN, MICHIGAN.

LIFTING DEVICE FOR CLOTHES-DRYING REELS.

No. 858,126.                Specification of Letters Patent.         Patented June 25, 1907.

Application filed December 10, 1904. Serial No. 236,377.

*To all whom it may concern:*

Be it known that I, JOSEPH G. WENDLING, a citizen of the United States, residing at Cheboygan, county of Cheboygan, State of Michigan, have invented a certain new and useful Improvement in Lifting Devices for Clothes-Drying Reels; and I declare the following to be a full, clear, and exact description of the same, such as will enable others skilled in the art to which it pertains to make and use the same, reference being had to the accompanying drawings, which form a part of this specification.

This invention relates to clothes drying reels; it has for its object an improved means for lifting and lowering the reel head.

In the drawings:—Figure 1, is a perspective of a complete reel. Fig. 2, is a cross section of the clutch, one such clutch is used to lift and one is used to sustain the reel. Fig. 3 is a detail view of one of the reel arms, showing the pins thereon.

1 indicates a post of any suitable character to which is secured guide brackets 3 and 4, for the stem of a reel; to the post are also secured holding brackets 5 and 6, one of which 5, holds a sustaining clutch, and the other of which 6, holds the actuating lever 7, of a lifting clutch. The lifting clutch and the sustaining clutch are similar in construction and each consists of a clutch loop 8 and 8ᵃ respectively, with a stem 9 and 9ᵃ respectively. The loop 8 embraces the stem 10 of the reel; the stem 9 of the loop of the sustaining clutch extends through a slot in the bracket 5 and is provided on the projecting end with a pull 11. The loop 8 is somewhat larger in diameter than the stem 10 of the reel and clutches the stem by the torsional well known clutch action between a loop held from some fixed position in a way to oscillate on a diameter or on an axis parallel to a diameter, and a bar which passes through the loop, and also through guides which prevent the bar from oscillating with the loop.

The lifting clutch 8ᵃ, is a loop similar to the holding clutch, but its stem is linked to a lever 7, pivoted on the bracket 6, and the oscillation of the lever serves to actuate the reel stem and lift the reel which is held in its elevated position by the clutch 8. The reel head is made with four arms $a$, $b$, $c$, $d$, the inner ends of which are secured by straps to a ring $e$. The four arms are tied together, and each arm is braced to a ring $f$. The ring $f$ rests above the end $g$ of the stem 10, and engages around a pin K, which is driven down into the hollow of the stem 10. Below the ring $e$ is a collar 4 held to the stem 10 by a pin. In each arm of the reel head are a number of pins $m$, each of which is provided with an overhanging extended head to confine the line in the opening underneath the head above the arm and at the side of the pin; the pins are arranged in pairs, with the members of each pair having their heads turned parallel with the axis of the arm and in opposing directions, that is, the first one from the center of the reel out has the head turned toward the center of the reel and the second pin has the head turned radially outward from the center of the reel.

What I claim is:—

In a device of the character described, in combination with a supporting post, a stem, guides upon said post, through which said stem passes, brackets upon said post intermediate said guides and adjacent thereto, a locking clutch-loop engaging the upper part of said stem and having a lateral extension which engages a slotted portion in the end of the upper one of said brackets, an operating device attached to the end of said extension, a lifting clutch-loop engaging the lower part of said stem, an extension upon said lifting clutch loop and a link connecting the outer extremity of said extension and the inner extremity of a hand-lever pivoted at the extreme outer end of the lower one of the before mentioned brackets.

In testimony whereof, I sign this specification in the presence of two witnesses.

JOSEPH G. WENDLING.

Witnesses:
C. S. REILLEY,
FRANK KENNEY.